United States Patent [19]
Garuglieri

[11] Patent Number: 5,406,873
[45] Date of Patent: Apr. 18, 1995

[54] TABLE CLAMP

[75] Inventor: Andrea Garuglieri, Colle Brianza, Italy

[73] Assignee: Black & Decker Inc., Newark, Del.

[21] Appl. No.: 111,752

[22] Filed: Aug. 25, 1993

[30] Foreign Application Priority Data

Aug. 28, 1992 [GB] United Kingdom ............... 9218385

[51] Int. Cl.6 .................. B27B 5/20; B27B 27/08
[52] U.S. Cl. ................................. 83/471.3; 83/477; 83/490; 83/698.31; 83/699.51; 144/286 R
[58] Field of Search ............. 83/471.3, 477, 477.2, 83/490, 698.31, 699.51; 144/286 R, 286 A

[56] References Cited

U.S. PATENT DOCUMENTS 3,565,135 2/1971 Rosenthal, Jr. et al. ......... 83/471.3
4,069,849 1/1978 O'Grady .................. 144/286 R X
4,527,453 7/1985 van Hauten .................. 83/490 X Primary Examiner—Richard K. Seidel
Assistant Examiner—Raymond D. Woods
Attorney, Agent, or Firm—Charles E. Yocum; Dennis A. Dearing; John D. Del Ponti

[57] ABSTRACT

A work bench (10) such as a miter/bench saw comprises a fixed table (16) having a rotatable platform (15) rotatably inserted in an opening in the fixed table. A clamp (72) for clamping the rotatable platform at a fixed angular position relative to the fixed table comprises a cut (70) extending through the table and extending outwardly from the circular opening in the table to an edge of the table. A lever (72) presses together the edges of the cut so that the circular opening grips the rotatable platform thereby clamping the rotatable platform at a fixed angular position.

9 Claims, 3 Drawing Sheets

5,406,873

TABLE CLAMP

BACKGROUND OF THE INVENTION

The present invention relates to a work bench comprising a rotatable platform and means to clamp the rotatable platform at a fixed angular position.

It is commonplace in the machine tool art to provide a work bench having a rotary power saw fixed thereto. Wooden planks or other materials to be sawn are clamped to the work bench against a fence and cut with the power saw. In order to achieve variable angle mitre and/or bevel cutting of wooden planks it is desirable that the power saw should be capable of angular movement relative to the fence. The mitre/bevel angle can then be changed between successive cutting operations. However, the saw must be rigidly secured in a given angular position while the cutting operation is taking place.

Methods are already known for attaching a power saw to a work bench such that the saw is capable of angular movement relative to workpieces clamped to the work bench. For example, it is known to provide a mitre saw in which a rotary power saw assembly is mounted on a rotatable platform set in a fixed work surface. The blade of the power saw is thus rotatable relative to workpieces that are clamped to the fixed work surface against the fence. However, present clamping systems for maintaining the rotatable platform at a fixed angular position during the cutting operation are unsatisfactory.

For example, they are frequently directional so that the centre of the rotatable platform might not stay central in the fixed work surface. In one saw, a cam arrangement on the fixed table presses the rotatable platform across its diameter from one edge behind the fence. If the platform is loose in the table, as it must be to enable easy rotation thereof in the table, then this arrangement inevitably results in positional error of the platform in the table. At least this error is reasonably consistent and can be accommodated to some extent by the user. Another saw has the platform clamped vertically with respect to the plane of the table which means that the platform can be in any position in the table when the clamp is operated so that no accommodation of the error can be made.

SUMMARY OF THE INVENTION

It is an object of the present invention to provide a work bench having a rotatable platform therein suitable for mounting a power saw, and having a clamping arrangement that enables the rotatable platform to be clamped at any angular position quickly, easily and securely. More importantly however is to clamp the platform centrally in the table in any mitre position thereof.

The present invention provides a work bench comprising a table, a rotatable platform inserted in a circular opening in the table and means to clamp the rotatable platform at a fixed angular position relative to the table, characterised in that the means to clamp the rotatable platform comprises a cut extending through the table and having first and second edges extending outwardly from the circular opening to an edge of the table and means to press together the first and second edges of the cut.

Such an arrangement is particularly suitable for a saw bench of the type described in our co-pending British patent application number 9218363.1 filed 28 Aug. 1992 under the title "Pivoting Power Tool with Table" and which is generally of the type first disclosed in DE-A-1628992. That is to say, a saw of the type in which the table is pivotable in a frame so that, in one position, the saw assembly is above the table and is operable as a mitre saw whereas, in the other position, the saw assembly is below the table with the blade protruding up through a slot in the table and is operable as a bench or table saw.

In such a saw the table is necessarily thin (in order to get a reasonable depth of cut in the bench saw position) and this exacerbates the problems identified above. On the other hand, this requirement assists the operation of the present invention because, at least from the cut around to the pivot axis of the table in the frames, the table can have the necessary flexibility to allow this type of clamping to be employed and, more importantly, to have an essentially inwardly directed radial effect which is necessary to retain concentricity of the platform in the table.

Where the pivot axis is displaced back towards the rear of the table as described in our co-pending application mentioned above, this beneficial effect is further enhanced.

Preferably the means to press together the first and second edges of the cut comprises a lever pivotably attached to the table on a first side of the cut and means to engage the lever with the table on a second side of the cut, whereby moving the lever from an open to an engaged position presses together the first and second edges of the cut. Preferably the means to engage the lever with the table comprises a pin joined to the lever by a first pivotable connection at a first end of the pin and joined to the table by a second pivotable connection at a second end of the pin. Preferably one of the pivotable connections comprises a pivotable cup in which one of the ends of the pin is engaged, and preferably the pin itself comprises a screw which is engaged in a thread in one of the pivotable connections so as to enable adjustment of the distance through which the first and second edges of the cut are pressed together by the action of the lever.

Pressing together the edges of the cut causes the table to deform and grip the rotatable platform, thereby clamping the rotatable platform at a fixed rotational position. The present invention thus provides a very secure clamp for the rotatable platform. Another advantage of the present invention is that the means to press together the edges of the cut is preferably positioned near the edge of the table, well away from the rotatable platform. This enables the work surface on and around the rotatable platform to be kept flush and unencumbered by clamping equipment. A further advantage of the present invention is that clamping of the rotatable table can be achieved quickly and easily, especially when the means to press together the edges of the cut is a pivotable lever as described herein.

BRIEF DESCRIPTION OF THE DRAWINGS

An embodiment of the present invention will now be described further, by way of example, with reference to the accompanying drawings, in which:

FIG. 2b is a side elevational inset detail view of a portion of the workbench taken from the line 2b—2b of FIG. 2a.

FIG. 3a shows the lever mechanism in the closed (engaged) position, and FIG. 3b shows the lever mechanism in the open position.

DETAILED DESCRIPTION OF A PREFERRED EMBODIMENT

Figure 1:
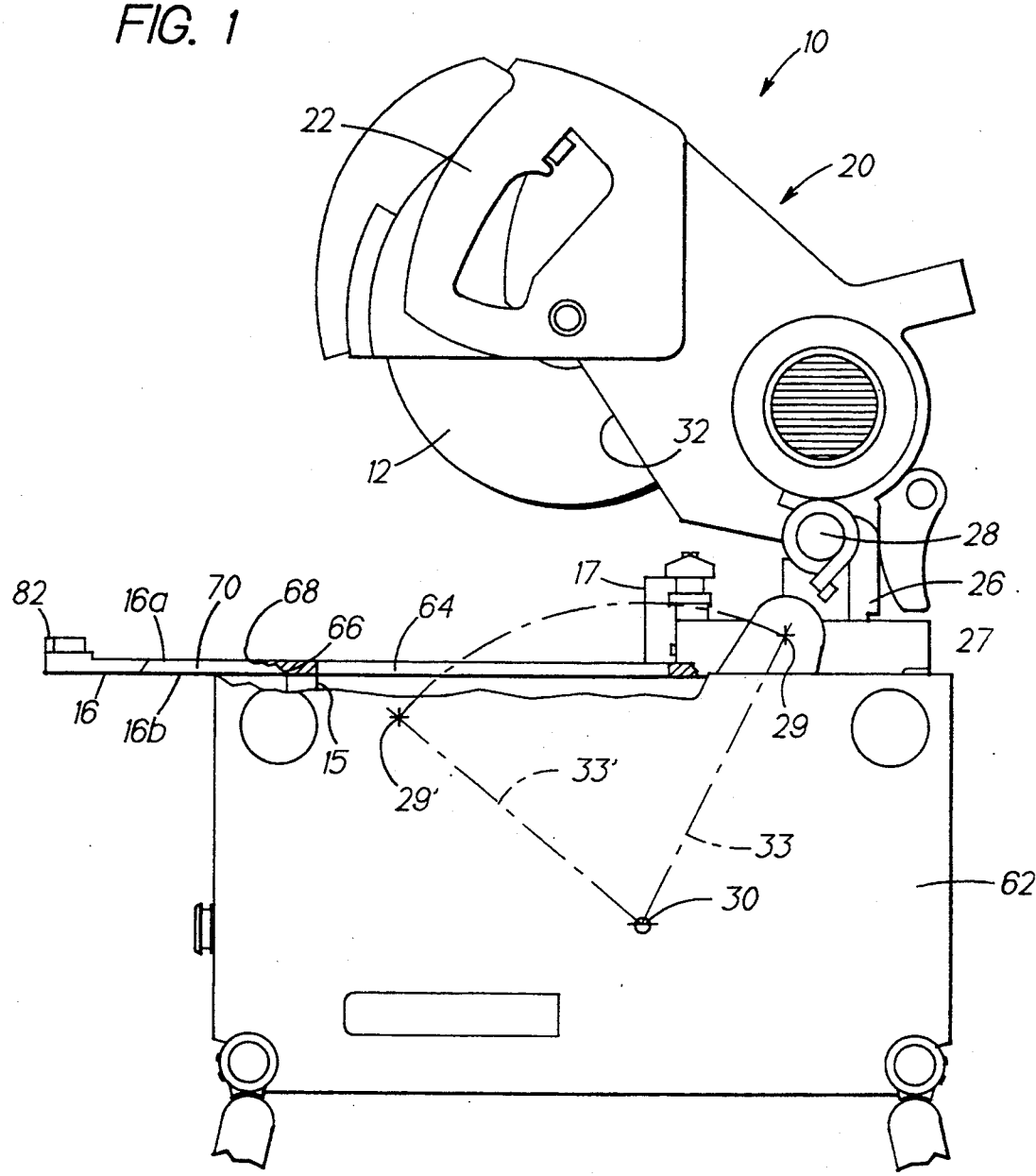
FIG. 1 is a side view of a work bench according to the present invention configured as a mitre saw bench.

Referring to the drawings, the work bench 10 comprises a table 16 mounted in a frame 62. A rotatable platform 15 is rotatably inserted in a circular aperture in the table 16. A pivot member 26 is attached to the circular platform 15, and a saw assembly 20 pivots about axis 28 on the pivot member 26. The saw assembly 20 has a motor driven blade 12 and a handle 22 by means of which the saw assembly 20 may be pivoted up and down about the axis 28. A slot 64 for receiving the blade 12 is provided in the rotatable platform 15.

The rotatable platform 15 is provided with a tongue 68 around its circumference which engages with a groove 66 around the circumference of the circular opening in the table 16. This tongue-and-groove arrangement holds the rotatable platform 15 in a fixed vertical position relative to the table 16, but allows rotational movement of the rotatable platform 15 relative to the table 16.

The work bench 10 is provided with fences 17 fixed to the table 16 for holding workpieces at a fixed angle while the workpieces are being cut.

The saw assembly 20 can be pivoted fight down until the blade 12 protrudes through the slot 64 and a lower edge 32 of the housing 20 is flush with the rotatable platform 15.

In this position the whole table 16 with its platform 15 and saw assembly 20 can be pivoted in the frame 62 about axis 29. At the same time axis 29 can pivot on lever 33 about axis 30 to position 29' which is a corresponding position to position 29 so that the table 16 is in essentially the same position as shown in FIG. 1, but inverted.

In this position the saw bench 10 is operable as a table saw or bench saw with large workpieces (or small) being movable over the blade 12 on the underside 16b (now on top) of the table 16.

In the mitre saw position, the maximum length of cut possible through workpieces is limited by the size of the blade 12, because workpieces positioned against the fence 17 on the top surface 16a of the table have the blade plunged into them without them being moved. Consequently, behind the fence 17, the surface of the table 16 need not be unencumbered. In front of the rotatable platform 15 it is also unnecessary to have the table 16 entirely free of obstruction because it is unlikely workpieces as large as that would be cut on the saw bench 10 in this mitre position.

On the other hand, the surface 16b must be quite unencumbered because in the bench saw position any size of workpiece needs to be supported on, and flush with, the table 16 for movement through the blade 12.

The rotatable platform is provided to enable mitre cuts to be made in workpieces supported against fence 17. The platform and the saw assembly 20 carried by the platform can rotate in the table 16 about central axis 31. This takes slot 64 from position 64a to 64b. Obviously, the platform 15 must be quite free in the table 16 to enable this movement to occur. Equally obviously, when cuts are to be made, the platform must be accurately positioned and held firm to allow accurate and repeatable cuts to be made. Consequently, the present invention provides a clamping means as discussed further below to releaseably clamp the platform 15 in the table 16.

The clamping means consists of a cut 70 of width 1-20 mm, preferably about 10 mm, extending through the table 16 and extending radially from the circular opening in the table 16 to the front edge of the table 16. Near the edge of the table 16 there is situated a lever 72 which is pivoted at 74 to one side of the cut 70. On the other side of the cut 70, a cup 76 is pivoted, the cup receiving a pin or grub screw 78 adjustable in a pivot 80 rotatably received in the lever 72. The cup 76 is positioned closer to the pivot 74 than is the pivot 80. The effect of this is that pushing on the pin or grub screw 78 with the lever will tend to press together the edges of the cut 70. The lever 72 has a handle 82.

Figure 3A:
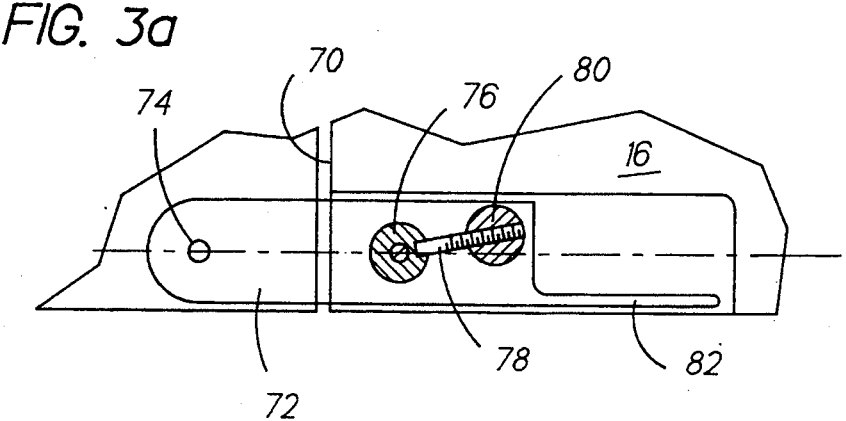
FIGS. 3a and 3b are detailed plan views of the lever mechanism to press together the edges of the cut in the work bench of FIG. 1.

The clamping means operates as follows. When the lever is in the closed position shown in FIG. 3a the handle 82 is flush with the front edge of the table 16. In this position the grub screw 78 presses the cup 76 towards the pivot axis 74 thereby pressing the sides of the cut 70 together. This results in a slight deformation of the circular opening so that the sides of the circular opening grip the rotatable platform 15. This prevents further rotation of the circular platform and effectively clamps the rotatable platform at a fixed angular position.

It should be noted that the only connection between the table 16 and the frame 62 is through pivot axis 29, and this is indirectly through levers 33 to pivot axis 30. Consequently the deformation of the table 16 is spread around almost the entire circumference of the circular opening so that the clamping force on the platform 15 is as radial as it is possible to be. This ensures the concentricity of the platform 15 in the table 16. Moreover, the deformation of the table is negligible.

Figure 3B:
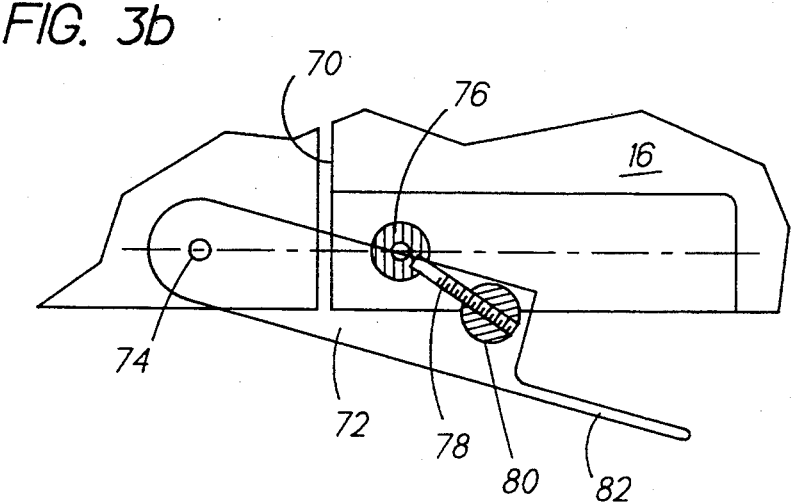

When the handle 82 is released and the lever 72 is moved to the open position shown in FIG. 3b, the sides of the cut 70 can separate. This releases the strain on the table so that the circular opening in the table no longer grips the rotatable platform and leaves the rotatable platform free to rotate in the circular opening. Adjustment of the grub screw 78 in the pivot 80 alters the distance through which the sides of the cut 70 are pressed together, and thereby alters the clamping force applied to the rotatable platform when the lever 72 is in the closed position.

There are several further points to note. The clamping means is situated at some distance from the rotatable platform 15 at the front edge of the table 16. This further enhances the radially inward clamping effect which it is desired to achieve.

Figure 2A:
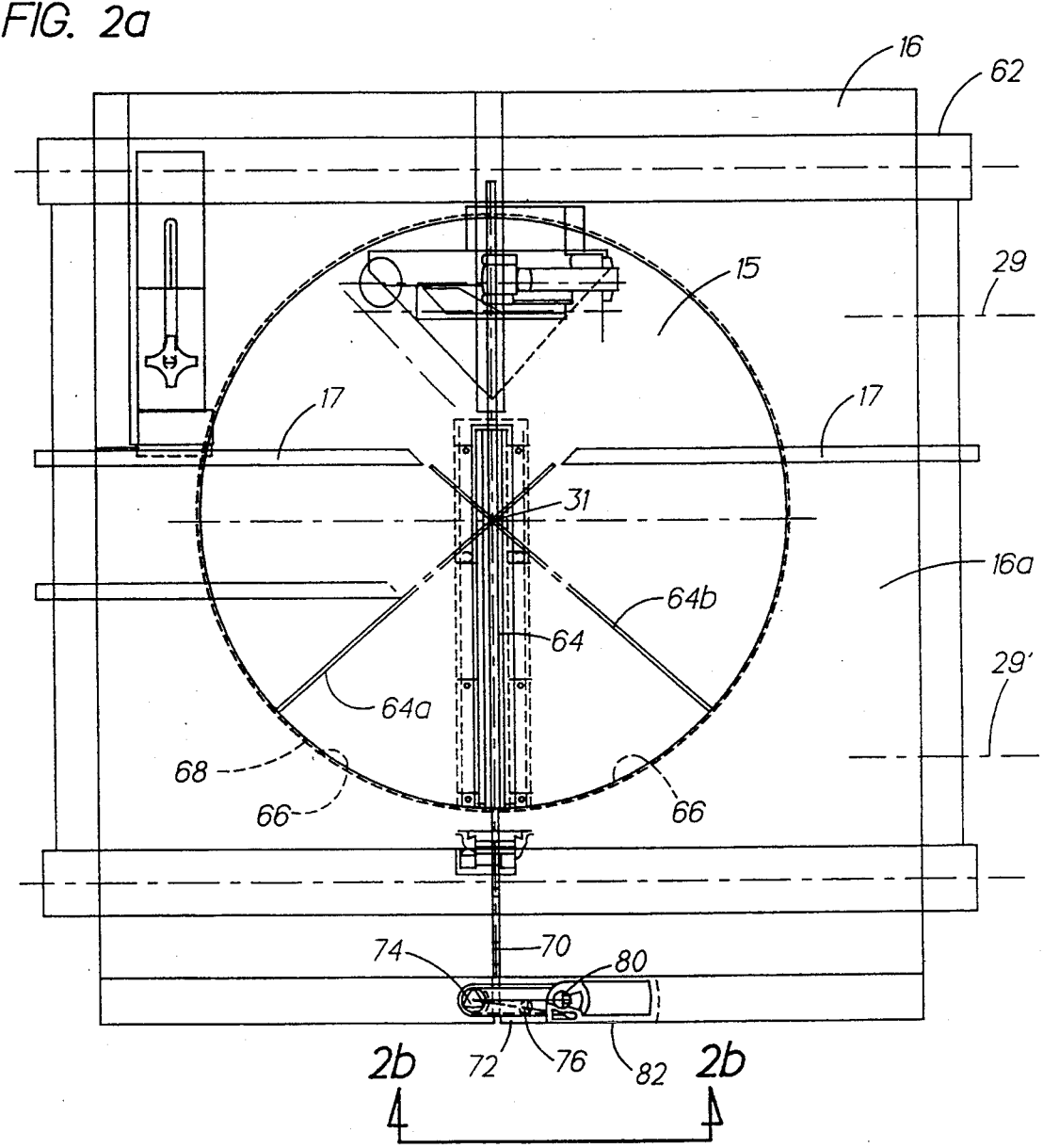
FIG. 2a is a plan view of the workbench of FIG. 1.
Figure 2B:
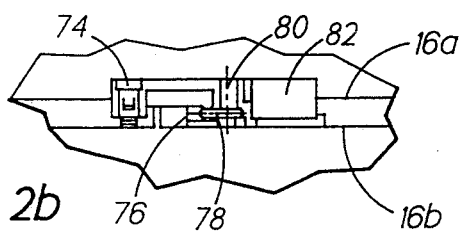

Also, in FIG. 2a it should be noted that the main bulk of the clamping means is above the level of surface 16a of the table and does not intrude below the surface 16b.

The above-described arrangement provides a simple and easy-to-use means to press together the sides of the cut 70. However, it will readily be appreciated that the above arrangement is only one of several manually or mechanically operated arrangements that could be used for the same purpose. Likewise, the skilled reader will be able to envisage many other possible work bench configurations falling within the scope of the present invention.

What is claimed is:

1. A work bench comprising a table defining a circular opening, a rotatable platform rotatably inserted in the circular opening of the table and means to clamp the rotatable platform at a fixed angular position relative to the table, the means to clamp the rotatable platform comprising:

a cut extending through the table and having first and second edges extending outwardly from the circular opening to an edge of the table, and means to bring together the first and second edges of the cut.

2. A work bench according to claim 1, wherein the means to bring together the first and second edges of the cut comprises a lever pivotably attached to the table on a first side of the cut and means to engage the lever with the table on a second side of the cut, whereby moving the lever from an open to an engaged position brings together the first and second edges of the cut.

3. A work bench according to claim 2, wherein the means to engage the lever with the table comprises a pin having a first end and a second end joined to the lever by a first pivotable connection at the first end of the pin and joined to the table by a second pivotable connection at the second end of the pin.

4. A work bench according to claim 3, wherein one of the pivotable connections comprises a pivotable cup in which an end of the pin is engaged.

5. A work bench according to claim 3, wherein the pin comprises a screw engaged in a thread in one of said pivotable connections, whereby adjustment of the screw in the thread enables the first and second edges of the cut to be brought together by an adjustable distance when the lever is engaged.

6. A work bench according to claim 1, wherein the rotatable platform includes a tongue around its periphery, the rotatable platform being rotatably held in the circular opening by means of the tongue and a complementary groove extending around the circular opening.

7. A work bench according to claim 1, wherein the rotatable platform includes a groove around its periphery, the rotatable platform being rotatably held in the circular opening by means of the groove and a complementary tongue extending around the circular opening.

8. A work bench according to claim 1, further comprising a saw assembly attached to the rotatable platform.

9. A work bench according to claim 1, further comprising at least one fence fixed to the table for supporting a workpiece.

* * * * *